United States Patent Office 3,122,542
Patented Feb. 25, 1964

3,122,542
METHOD FOR THE PREPARATION OF 2,4-DI-
AMINO-6-FLUORO-s-TRIAZINES
Enrico Knusli, Riehen, near Basel, and Walter Stamm-
bach and Hans Gysin, Basel, Switzerland, assignors to
J. R. Geigy A.-G., Basel, Switzerland
No Drawing. Original application May 5, 1960, Ser. No.
26,932. Divided and this application Apr. 12, 1962,
Ser. No. 190,169
Claims priority, application Switzerland May 6, 1959
1 Claim. (Cl. 260—249.8)

The present invention concerns a new, improved process for the production of fluorinated s-triazine derivatives as well as the new triazine derivatives having valuable herbicidal properties which are obtained by this process.

It is known that cyanuric chloride can be converted into cyanuric fluoride by heating it with at least 3 mols of potassium fluoride or with another suitable fluoride in the presence of an antimony compound, for example antimony pentoxide or antimonypentachloride. The reaction of cyanuric fluoride with one or two mols of hydroxyl compounds, mercapto compounds or aromatic amines to form 2-substituted 4,6-difluoro-s-triazines or 2.4-disubstituted 6-fluoro-s-triazines is also known. The reaction of cyanuric fluoride with one mol of an aliphatic amine to form 2-substituted 4.6-difluoro-s-triazines has also been described. On the other hand, the production of 2.4-diamino-substituted 6-fluoro-s-triazines by reacting cyanuric fluoride with two mols of an aliphatic amine has not been described in detail up to now.

It has now surprisingly been found that whilst avoiding the production of cyanuric fluoride which is extremely unpleasant to handle, new compounds can be obtained of the general formula

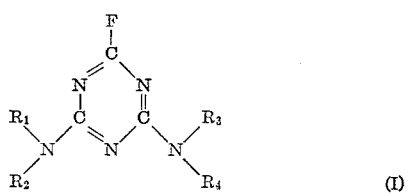

(I)

wherein $R_1$, $R_2$ and $R_3$ represent hydrogen, the same or different low molecular alkyl, alkenyl or alkoxyalkyl radicals or aralkyl radicals, and $R_4$ represents a low molecular alkyl, alkenyl or alkoxyalkyl radical or an aralkyl radical, and in which the pairs of alkyl radicals R, and $R_2$ or $R_3$ and $R_4$ can be bound to each other direct or by way of an oxygen atom, by heating, in the presence or absence of inert organic solvents, compounds of the general formula

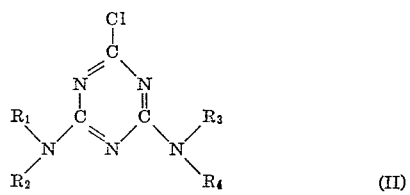

(II)

wherein $R_1$ to $R_4$ have the meanings given above, with at least one normal equivalent of a neutral salt of hydrofluoric acid. In this process, not only the annoyance and danger of poisoning incurred by cyanuric fluoride, which is also far less stable to water than cyanuric chloride, is avoided, but also the new process has great economic advantages, in particular because no apparatus which is stable to hydrogen fluoride is necessary in the reaction. In addition, in the process according to the invention, the total amount of fluorine salts to be reacted, for example potassium fluoride, is reduced to a fraction, i.e. to about one third.

Examples of neutral fluorides are potassium fluoride, sodium fluoride, ammonium fluoride, calcium fluoride, zinc fluoride, antimony-(III)-fluoride, and also mixtures of several of the above salts. To produce the end product, a normal equivalent or any excess desired of neutral fluorine salt is used. The temperature necessary to start the reaction can vary between wide limits, for example between 100 and 200° C. The progress of the reaction can be followed, for example, by argentometrically testing the chlorine atoms liberated on the exchange of halogen atoms in small samples of the reaction mixture. In this way, the reaction temperature and time for every special starting material can be determined; the time can vary between 12 and 100 hours depending on the temperature. The reaction is performed advantageously in suitable higher boiling inert organic solvents, in particular in dimethyl formamide or possibly also in ethylene glycol diethyl ether or diethylene glycol diethyl ether; these solvents can be partially or completely distilled off during the reaction if desired. The reaction can also be performed in the presence of suitable catalysts.

The substituted 6-fluoro-s-triazines of the general Formula I obtained according to the invention are products which can be used in many ways, some of them having very interesting biological, in particular herbicidal, properties. Particularly stressed is the excellent herbicidal activity of the 2.4-bis-alkylamino-6-fluoro-s-triazines obtained starting from 2.4-bis-alkylamino-6-chloro-s-triazines, in particular those which contain ethyl or isopropyl groups as alkyl radicals such as, e.g. 2.4-bis-ethylamino-6-fluoro-s-triazine, 2-methyl- and 2-ethylamino-4-isopropylamino-6-fluoro-s-triazine and 2.4-bis-isopropylamino-6-fluoro-s-triazine.

The following compounds, for example, can be used as starting materials of the general Formula II:

2-amino-4-ethylamino-, 2-amino-4-diethylamino-, 2-amino-4-diallylamino-, 2.4-bis-methylamino-, 2.4-bis-ethylamino-, 2-methylamino-4-ethylamino-, 2.4-bis-n-propylamino-, 2.4-bis-isopropylamino-, 2-n-propylamino-4-methylamino-, 2-n-propylamino-4-ethylamino-, 2-isopropylamino-4-methylamino-, 2-isopropylamino-4-ethylamino-, 2 - isopropylamino - 4 - n - propylamino-, 2.4 - bis - n - butylamino-, 2.4-bis-isobutylamino-, 2.4-bis-(γ-methoxypropylamino)-, 2.4-bis-(γ-isopropoxypropylamino)-, 2-(γ-methoxypropylamino)-4-ethylamino-, 2-(γ-methoxypropylamino)-4-isopropylamino-, 2-(β-methoxyethylamino)-4-ethylamino-, 2-(β-methoxyethylamino)-4-isopropylamino-, 2-(β-ethoxyethylamino)-4-ethylamino-, 2-(β-ethoxyethylamino)-4-isopropylamino, 2.4-bis-allylamino-, 2.4-bis-diallylamino-, 2-ethylamino-4-allylamino-, 2-isopropylamino-4-allylamino-, 2.4-bis-benzylamino-, 2-benzylamino-4-ethylamino-, 2-diethylamino-4-ethylamino-, 2-diethylamino - 4 - isopropylamino-, 2.4 - bis - diethyl - amino-, 2.4-bis-(N-ethylbenzylamino)-, 2.4-bis-pyrrolidino-, 2.4-bis-piperidino-, 2-piperidino-4-ethylamino-, 2.4-bis-morpholino-, 2-morpholino-4-isopropylamino- and 2-morpholino-4-methylamino-6-chloro-s-triazines.

The following examples further illustrate the performance of the process according to the invention. Parts are given therein as parts by weight and their relationship to parts by volume is as that of grammes to cubic centimetres.

*Example 1*

50 parts of 2.4-bis-ethylamino-6-chloro-s-triazine are refluxed for 96 hours with 40 parts of potassium fluoride in 500 parts by volume of dimethyl formamide. The reaction mixture is then poured into 2000 parts of water and the crude 2.4-bis-ethylamino-6-fluoro-s-triazine which precipitates is filtered off under suction. It can be purified, for example, by recrystallisation from dioxan and then melts at 223–224°.

On adding silver nitrate solution to the aqueous phase, the amount of silver chloride corresponding to the quantitative reaction is obtained therefrom. If desired, some of the dimethyl formamide can be distilled off during the reaction in order to reduce the amount to be regained from the aqueous phase.

*Example 2*

61 parts of 2-isopropylamino-4-diethylamino-6-chloro-s-triazine and 40 parts of potassium fluoride in 500 parts by volume of dimethyl formamide are refluxed for 96 hours. The solvent is then distilled off in vacuo and the residue, which has been taken up in ether, is washed with water. The desired 2-isopropylamino-4-diethylamino-6-fluoro-s-triazine is obtained after rectification of the ether solution. It boils at 108–111° under 0.2 mm. pressure. The product solidifies on cooling and then melts at 80–84°.

*Example 3*

43 parts of 2-amino-4-ethylamino-6-chloro-s-triazine and 40 parts of potassium fluoride in 400 parts by volume of dimethyl formamide are refluxed for 48 hours. The reaction mixture is then poured into 2000 parts of water and the crude 2-amino-4-ethylamino-6-fluoro-s-triazine which precipitates is filtered off under suction. After recrystallisation from dioxan, it melts at 232–234° (depending on the time of heating).

On using the correspondingly substituted 6-chloro-s-triazines, 2.4-bis-isopropylamino-6-fluoro-s-triazine (M.P. 218–220°),
2-isopropylamino-4-methylamino-6-fluoro-s-triazine (M.P. 166–168°),
2-isopropylamino-4-ethylamino-6-fluoro-s-triazine (MP. 186–187°),
2.4-bis-diethylamino-6-fluoro-s-triazine (B.P.$_{0.1}$ 104–106°),
2-diethylamino-4-ethylamino-6-fluoro-s-triazine (B.P.$_{0.06}$ 90°),
2-n-propylamino-4-methylamino-6-fluoro-s-triazine (M.P. 180–182°),
2-($\gamma$-methoxypropylamino)-4-ethylamino-6-fluoro-s-triazine (M.P. 130–132°),
2-morpholino-4-isopropylamino-6-fluoro-s-triazine (M.P. 130–132°),
2.4-bis-piperidine-6-fluoro-s-triazine (M.P. 110–120°)

and 2-benzylamino-4-ethylamino-6-fluoro-s-triazine (M.P. 184–186°)

are obtained in an analogous manner.

The 2.4-diamino-substituted 6-fluoro-s-triazines both mentioned above as well as others are excellently suitable as active ingredients for weed killers, both for the selective suppression and rotting of weeds among cultivated plants as well as for the total destruction and restriction of undesired plant growth. By weeds are meant here also undesired cultivated plants, for example, those from a previous crop. The compounds defined above are also suitable as active ingredients for the attainment of other restrictive influences on plant growth, in particular defoliation, e.g. of cotton plants, ripeness acceleration by early dehydration, e.g. of potato plants, also for the reduction of the amount of fruit formed, lengthening of the harvesting period and time of storage.

The weed killers according to the invention can be solutions, emulsions, suspensions or dusts; the form depends on the intended use. All forms of application, however, must ensure that the active ingredient is contained in a finely distributed form. In particular, when used for the total destruction of plant growth, early dehydration as well as defoliation, the action can be increased by the use of carriers having a phytotoxic action such as, e.g. high boiling mineral oil fractions; on the other hand, the selectivity of the restrictive action, e.g. in selective weed killing, is generally more clearly attained on using carriers which are indifferent to plants.

Higher boiling organic liquids such as mineral oil fractions, coal tar oils as well as also vegetable and animal oils are used for the production of solutions. In order to more easily dissolve the active ingredients in these liquids, possibly slight amounts of organic liquids having better solvent action and generally a lower boiling point can be added, i.e. solvents such as alcohols, e.g. ethanol or isopropanol, ketones, e.g. acetone, butanone or cyclohexanone, cyclic hydrocarbons e.g. benzene, toluene or xylene, chlorinated hydrocarbons e.g. tetrachlorethane or ethylene chloride or mixtures of such substances.

The aqueous forms for application are chiefly emulsions and dispersions. The substances are homogenised in water either as such or in one of the solvents named above, advantageously by means of wetting or dispersing agents. Quaternary ammonium compounds are examples of cation active emulsifying or dispersing agents; soaps, soft soaps, aliphatic long chain sulphuric acid monoesters, aliphatic-aromatic sulphonic acids, long chain alkoxyacetic acids are examples of anion active emulsifying agents; and polyethylene glycol ethers of fatty alcohols or alkyl phenols and polycondensation products of ethylene oxide are examples of non-ionogenic emulsifying agents. On the other hand, concentrates can be produced which consist of active ingredient, emulsifying agent or dispersing agent and, possibly, solvent; these are suitable for dilution with water.

Firstly, dusts can be produced by mixing or milling the active ingredient with a solid carrier. Such carries are: talcum, diatomaceous earth, kaolin, bentonite, calcium carbonate, boric acid, tricalcium phosphate, or also sawdust, ground cork charcoal and other materials of vegetable origin. On the other hand substances can also be drawn onto the carriers by means of a volatile solvent. By the addition of wetting agents and protective colloids, pulverulent preparations and pastes can be made suspendable in water and used as sprays.

The various forms for application can be more closely adapted to the intended use in the usual way by the addition of substances which improve the distribution, the adhesive properties, the stability to rain and/or the penetration powers. Examples of such substances are fatty acids, resins, wetting agents, glue, casein or alginates. The biological effect can be widened in a similar way by the addition of substances having bactericidal or fungicidal properties, for example, for the attainment of a general earth sterilisation or, in selective weed killing, for the protection of cultivated plants from other injurious organisms. Substances which also influence plant growth such as, e.g. 3-amino-1.2.4-triazole for accelerating the onset of action or such as, e.g. salts of $\alpha.\alpha$-dichloropropionic acid for widening the range of herbicidal action may be desirable. The combination with manures may be labour saving and can strengthen the cultivated plants to be protected.

Examples of typical forms of application are given below:

*Example 4*

20 parts of active ingredient, e.g. 2.4-bis-ethylamino-6-fluoro-s-triazine and 80 parts of talcum are milled to the greatest degree of fineness in a ball mill. The mixture obtained serves as a dust.

*Example 5*

20 parts of active ingredient, e.g. 2.4-bis-diethylamino-6-fluoro-s-triazine, are dissolved in a mixture of 48 parts of diacetone alcohol, 16 parts of xylene and 16 parts of an anhydrous high molecular condensation product of ethylene oxide and higher fatty acids. This concentrate can be diluted with water to form emulsions of any concentration desired.

*Example 6*

80 parts of active ingredient, e.g. 2-methylamino-4-isopropylamino-6-fluoro-s-triazine, are mixed with 2–4 parts of a wetting agent, e.g. a sulphuric acid ester of an alkyl polyglycol ether, 1–3 parts of a protective colloid, e.g. sulphite waste liquor, and 15 parts of an inert, solid carrier such as, e.g. kaoline, bentonite, chalk or kieselguhr and the mixture is then finely milled in a suitable mill. The wettable powder obtained can be stirred with water and produces very stable suspensions.

*Example 7*

10 parts of active ingredient, e.g. 2-diethylamino-4-isopropylamino-6-fluoro-s-triazine, are dissolved in 90 parts of a high boiling organic liquid such as, e.g. coal tar oil, diesel oil or spindle oil.

*Example 8*

5 parts of active ingredient, e.g. 2.4-bis-isopropylamino-6-fluoro-s-triazine, are mixed and milled with 95 parts of calcium carbonate (=ground limestone). The product can be used as a sprinkling agent.

*Example 9*

5 parts of active ingredient, e.g. 2-ethylamino-4-isopropylamino-6-fluoro-s-triazine, are mixed with 95 parts of a pulverulent carrier, e.g. sand or calcium carbonate, and the mixture is moistened with 1–5 parts of water or isopropanol. The mixture is then granulated.

Before granulating the above mixture or one containing more active ingredient, for example one consisting of 10 parts of active ingredient and 90 parts of calcium carbonate, a greater amount, e.g. 100–900 parts of a possibly water soluble artificial manure such as, e.g. ammonium sulphate, can be mixed therewith.

The present application is a division of copending application, Serial No. 26,932, filed May 5, 1960, now abandoned.

What we claim is:

A method for preparing a compound of the formula

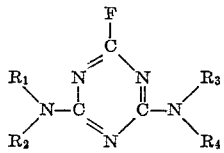

wherein
$R_1$, $R_2$ and $R_3$ each represents a member selected from the group consisting of hydrogen, lower alkyl, lower alkenyl and lower alkoxyalkyl, at least one of $R_1$, $R_2$ and $R_3$ being H, $R_4$ represents a member selected from the group consisting of lower alkyl, lower alkenyl and lower alkoxyalkyl, $R_1$ and $R_2$ together with the adjacent nitrogen atom represent a member selected from the group consisting of the pyrrolidino, the piperidino and the morpholino radical, and $R_3$ and $R_4$ together with the adjacent nitrogen atom represent a member selected from the group consisting of the pyrrolidino, the piperidino and the morpholino radical, which comprises heating at a temperature between 100 and 200° C. and in the presence of dimethyl formamide, a compound of the formula

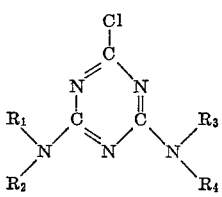

wherein $R_1$, $R_2$, $R_3$ and $R_4$ have the meanings given above, with at least one normal equivalent of potassium fluoride.

References Cited in the file of this patent

UNITED STATES PATENTS

| 2,810,706 | Frazier et al. | Oct. 22, 1957 |
| 2,891,855 | Gypin et al. | June 23, 1959 |
| 3,037,853 | Luckenbaugh | June 5, 1962 |

FOREIGN PATENTS

| 567,073 | Belgium | May 14, 1958 |
| 570,522 | Belgium | Sept. 15, 1958 |

OTHER REFERENCES

Grisley et al.: Journ. Org. Chem., volume 23, 1958, pages 1802–1804.